United States Patent [19]
Yanagawa et al.

[11] Patent Number: 5,894,460
[45] Date of Patent: Apr. 13, 1999

[54] MAGNETO-OPTICAL CARD RECORDING APPARATUS EMPLOYING AN INITIALIZATION MAGNET AND A RECORDING MAGNET

[75] Inventors: Naoharu Yanagawa; Fumihiko Sano; Hiroshi Suzuki; Shinji Suzuki; Yasumitsu Suzuki; Masanori Nakahara, all of Tokorozawa, Japan

[73] Assignee: Pioneer Electronic Corporation, Tokyo, Japan

[21] Appl. No.: 08/908,176

[22] Filed: Aug. 7, 1997

[30] Foreign Application Priority Data

Aug. 30, 1996 [JP] Japan .................................. 8-248770

[51] Int. Cl.$^6$ .................................................. G11B 11/00
[52] U.S. Cl. .................................... 369/13; 369/14
[58] Field of Search ................... 369/13, 14, 112, 369/44.14, 44.17, 44.18, 110; 360/114, 59

[56] References Cited

U.S. PATENT DOCUMENTS

| | | | |
|---|---|---|---|
| 5,243,580 | 9/1993 | Maeda | 369/13 |
| 5,434,844 | 7/1995 | Miyamoto et al. | 369/275.2 |
| 5,462,811 | 10/1995 | Miyamoto et al. | 369/13 |
| 5,530,685 | 6/1996 | Katayama et al. | 369/13 |
| 5,574,703 | 11/1996 | Shimokawato et al. | 369/13 |

*Primary Examiner*—Tan Dinh
*Attorney, Agent, or Firm*—Evenson, McKeown, Edwards & Lenahan P.L.L.C.

[57] ABSTRACT

A rotary type pickup apparatus adopting a light modulation system, is capable of over-writing and suitable for miniaturization. In the optical pickup apparatus constituted by a stationary optical part and a rotary optical part which comprises an objective lens and a light beam guiding device, a recording magnet and an initialization auxiliary magnet are provided in the rotary optical part, the recording magnet being disposed close to the objective lens and the initialization auxiliary magnet being positioned over a rotation circumference where the objective lens rotates. Further provided are a recording magnet and an initialization auxiliary magnet which are disposed so as to pinch a magnetooptical recording medium together with the objective lens, the initialization auxiliary magnet being positioned behind the recording magnet in a sending direction of an optical card.

2 Claims, 10 Drawing Sheets

MAGNETO-OPTICAL CARD RECORDING APPARATUS EMPLOYING AN INITIALIZATION MAGNET AND A RECORDING MAGNET

BACKGROUND OF THE INVENTION

1. Field of the Invention

The present invention relates to an optical pickup apparatus, and more particularly to an optical pickup apparatus for recording/reproducing information on/from a magnetooptical recording medium which is capable of overwriting.

2. Description of Related Art

In recent years, a method to record information on a magnetooptical recording medium capable of over-writing has been devised as a recording method using a rotary-type optical recording head.

As the method for the over-writing, there are a method utilizing a magnetic field modulation system and a method according to a light modulation system.

Optical disk has been widely known as a recording medium for recording/reproducing an audio signal and a video signal. The optical disk has a capability to achieve a high recording density. However, its area which can be used for recording is small, so that a limitation is posed on its overall recording capacity.

Alternatively, there is a tape-shaped recording medium such as the magnetic tape used for a VTR (Video Tape Recorder) and the like. Although it is inferior to the optical disk in terms of recording density, the tape-shaped recording medium is capable of recording a quantity of information one hundred times that of the optical disk, and superior than the optical disk in terms of the recording capacity. Therefore, by combining a high recording density characteristic of the optical disk and a large recording capacity characteristic of the tape-shaped recording medium, a recording medium having a small size and also a large recording capacity can be realized.

Recording/reproducing of the information onto/from either the tape-shaped recording medium or a card-shaped recording medium (hereinafter referred to as an optical card) has been heretofore examined using a laser beam, in which a magnetooptical recording film such as TdFeCo is formed on a base film like a magnetic film.

A configuration of a conventional picking-up apparatus for recording/reproducing information onto an optical card is schematically shown in FIG. 1 by way of an example of a write once type apparatus.

As shown in FIG. 1, the conventional pickup apparatus consists of a signal generation circuit 16 which converts an input signal SR to a recording signal SR1 by performing signal processing for the input signal SR using a signal processing part 1, outputs it to a stationary optical part SOP, and performs signal processing for a reproducing signal from the stationary optical part SOP to output a reproducing signal SP, said input signal SR being supplied from the outside to be recorded; the stationary optical part SOP which makes light beam B for recording information onto an optical card 24 at the time of the recording of information in response to the recording signal SR1, said stationary optical part SOP including a light receiving device which receives reflection light of the light beam from the optical card 24 at the time of the reproduction of information and outputs a reproducing signal SP, a rotary optical part ROP which converges the light beam B onto the optical card 24 at the time of the recording of information while rotating around a straight line perpendicular to a recording surface of the optical card 24, said light beam B being emitted from the stationary optical part SOP, and serves to guide the reflection light of the light beam B from the optical card 24 to the stationary optical part SOP at the time of the reproduction of information; a conversion gear 26 which transports the optical card 24 together with a tray 25 holding to mount the optical card 24 in a longitudinal direction of the optical card 24 at a constant speed, thereby changing a positional relationship relative to the rotary optical part ROP; relative position changing device including a transportation motor 27 having a gear engaged with the conversion gear 26; and a magnet 28 to apply a magnetic field to the optical card 24 at the time of the recording of information.

The stationary optical part SOP consists of a laser control part L which outputs a laser driving signal SD to control the light beam B emitted from a laser diode 7 depending on the recording signal SR; a laser diode 7 which emits the light beam B depending on the laser driving signal SD; a beam splitter 9 which reflects a part of the light beam B from the laser diode 7 to guide it to a monitoring detector 4 incorporated in the laser control part L and the other part thereof passes therethrough to guide it to an actuator 11, and reflects the light beam B reflected by the optical card 24 to guide it to the light receiving part D; the actuator 11 which includes a lens to adjust a position of the light beam B such as tracking control and focus control for the light beam B and a driving part for the lens; a light receiving part D which receives the light beam B reflected by the beam splitter 9, generates a reproducing signal SP in response to the light beam B to output it, and generates a beam position adjusting signal (error signal) such as a focus error signal and a tracking error signal to emit it; a servo control circuit 17 which generates a driving signal for the actuator 11 in response to the beam position adjusting signal; a system controller 5 which a driving command to a laser driving circuit 2 and the servo control circuit 17 if necessary; and motor control device 6 which control a rotation of a rotation motor 23 using pulse signals (FG and PG) supplied from position signal generation device 18 of the rotary optical part ROP so that its rotation speed is made constant.

It should be noted that a collimator lens 8 is used to convert light emitted from the laser diode 7 to parallel light and a relay lens is used to converge the light beam to the actuator 11 and also to convert the light beam from the actuator 11 to parallel light.

The laser control part L consists of a recording circuit 1 which performs modulation processing for the input signal SR to output the recording signal SR1; the monitoring detector 4 which receives the light beam B reflected by the beam splitter 9 to output a monitoring signal SM; an APC (an Automatic Power Controller) 3 which outputs a monitoring control signal SR2 to control the light beam B depending on the monitoring signal SM; and a laser driving circuit 2 which outputs the laser driving signal SD to drive the laser diode 7 depending on the recording signal SR1 and the monitoring control signal SR2 when the driving command is made by the system controller 5.

The light receiving part D consists of a cylindrical lens 12 which provides the reflected light of the light beam B with astigmatic aberration in order to obtain a focus error signal used for focus control of light beam B from the optical card 24, the reflected beam of the light beam B being reflected from the optical card 24 by the beam splitter 9; a polarization beam splitter (PBS) 13 which passes polarization light therethrough, the polarization light having a predetermined polarized state included in the reflected light of the light beam B which is provided with the astigmatic aberration, and reflects other polarization light; a light receiving element 15 which receives the polarization light reflected by the PBS 13; a light receiving element 14 which receives the polarization light passing through the PBS 13; and a signal generation circuit 16 which generates the reproducing signal SP, the tracking error signal TE and the focus error signal FE depending on detection signals output from the light receiving elements 14 and 15.

The rotary optical part ROP consists of reflection mirrors 19 and 20 which serve as light beam guiding device for guiding the light beam emitted from the stationary optical part SOP to an objective lens 21 and form an optical path to guide the reflected light of the light beam B from the optical card 24 to the stationary optical part SOP; the objective lens 21 which converges the light beam B onto a recording surface of the optical card 24; a rotating motor 23 which rotatively drives a rotary drum 22 mounting the reflection mirrors 19 and 20 together with the foregoing light beam guiding device and the objective lens 21, the light beam guiding device and the objective lens 21 being driven rotatively thorough the rotary drum 22; and positional signal generation device 18 which generates a pulse signal as a positional signal indicating the rotation position of the rotary drum 22, the pulse signal being output in synchronization with the rotation of the rotating motor 23.

The position signal generation device 18 consists of first projection portions 181 of rectangular-shape to detect a rotation speed of the rotary drum 22, which are radially arranged at intervals of a first predetermined angle, for example, 45 degrees; second projection portions 182 arranged at intervals of a second predetermined angle, for example, 360 degrees, in a rotation axis of the rotary drum 22 against the first projection portions 181; a photo interrupter 183 provided so as to pinch the first projection portion 181 in a rotation axis direction; and a photo interrupter 184 provided so as to pinch the projection portion 182 in the rotation axis direction.

Each of the photo interrupters 182 and 184 consists of a pair of a light emitting element and a light receiving element and is fixed to a fixing portion having no relation to the rotation of the rotating motor 23. Therefore, when each of the foregoing projection portions 181 and 182 passes between the light emitting element and the light receiving element of the photo interrupter in accordance with the rotation of the rotating motor 23, the projection portions 182 and 182 shield the light from the light emitting elements whereby the pulse signals in response to the position of the projection portions are output from the light receiving element.

For example, when the first and second predetermined angles are set to 45 and 360 degrees, respectively, one pulse is obtained from the photo interrupter 183 each time the rotating motor 23 rotates by 45 degrees specifically, the pulse signals of eight pulses are obtained from the photo interrupter 183 every one rotation of the rotating motor 23 and the pulse signal of one pulse is obtained every one rotation thereof. Therefore, by counting the pulse signal (FG) output from the photo interrupter 183 triggering the pulse signal (PG) from the photo interrupter 184, the rotation position of the objective lens 21 can be detected from the count value.

By the pickup apparatus having the above described configuration, at the time of the recording of information, information is recorded while forming arc-shaped recording tracks on the optical card 24. Moreover, at the time of the reproduction of information, the recorded information is read out by the light beam B irradiated onto the optical card 24 so as to follow the recording track. In this summarized example, the write once type is used, the optical card 24 is a formatted one, and recording of information can be performed only once.

Next, a recording/reproducing operation of a picking-up apparatus capable of over-writing will be described using FIG. 2.

Referring to FIG. 2, a magnetooptical recording medium 141 composed of a recording layer formed of a magnetic thin film and an auxiliary layer, both of which are not shown in FIG. 2, is rotatively driven by a magnetooptical recording medium rotating device 142 and recording/reproducing of signals is carried out by laser beam converged by an objective lens 147. The laser beam is generated by a laser beam light source 150. At the time of the recording of information, in response to binary information input which is input to a light source driving circuit 151, the laser beam is incident on a collimator lens 149 as pulse light of high and low levels and is converted to parallel light. The light after passing through the collimator lens 149 is reflected by a beam splitter 148, and is converged onto the magnetooptical recording medium 141. An initialization auxiliary magnet 143 acts to initialize a region before the recording of information in the magnetooptical recording medium 141 to which information is to be recorded by a power source 145 and a control circuit 144, in such a manner that the magnetic orientations of the auxiliary layer of the magnetooptical recording medium 141 are made uniform in the same direction at the positions of the rotation angle shifted from the recording beam position. Moreover, a recording magnet 146 provides a recording magnetic field having a polarity opposite to that of the initialization auxiliary magnet 143 to the position of the recording light beam, whereby information is recorded onto the recording layer of the magnetooptical recording medium 141.

On the other hand, in case of the reproducing operation, laser beam from the laser beam light source 150, which is weaker than at the time of the recording of information and is not subjected to modulation, is incident onto the collimator lens, and is converted to parallel light. The parallel laser beam is reflected by the beam splitter 148 and converged on the magnetooptical recording medium 141 by the objective 147. The light reflected by the magnetooptical recording medium 141 returns to the objective lens 147 and passes through the beam splitter 148. Then, after passing through the beam splitter 148 the light passes through a condenser lens 152. Then, the reflected light passes through a polarization analyzer 153 and is converged onto a photoreceptor 154. The polarization analyzer converts the reflected light to an intensity change depending on the rotation state of a polarization surface. As a result, an output of the photoreceptor 154 is output as a reproducing signal in response to the recording information.

However, with the optical card recording/reproducing apparatus described in the foregoing, the problem arises that the apparatus has a large size when the initialization auxiliary magnet and the recording magnet are simply mounted thereon.

SUMMARY OF THE INVENTION

The object of the present invention is to provide an apparatus which is capable of over-writing for a rotary optical pickup apparatus and can be easily miniaturized, using a method according to a light modulation system.

To achieve the above objective, an optical pickup apparatus of a first aspect of the present invention comprises a stationary optical part, and a rotary optical part which includes an objective lens to converge light beam onto a recording surface of a magnetooptical recording medium for recording/reproducing information, the light beam being emitted from the stationary optical part, and light beam guiding device to guide the light beam to the recording surface through the objective lens and to guide reflected light of the light beam from the recording surface to the stationary optical part, the rotary optical part being rotatively driven together with the objective lens and the light beam guiding device around a straight line perpendicular to the recording surface, wherein a recording magnet and an initialization auxiliary magnet are provided in the rotary optical part and the recording magnet is disposed close to the objective lens and the initialization auxiliary magnet is disposed on the rotation circumference where the objective lens rotates.

An optical pickup apparatus of a second aspect of the present invention comprises a stationary optical part; a rotary optical part which includes an objective lens to converge light beam onto a recording surface of a magnetooptical recording medium for recording/reproducing information, the light beam being emitted from the stationary optical part, and a light beam guiding device to guide the light beam to the recording surface through the objective lens and to guide reflected light of the light beam from the recording surface to the stationary optical part, the rotary optical part being rotatively driven together with the objective lens and the light beam guiding device around a straight line perpendicular to the recording surface; and a driving device for moving the magnetooptical recording medium in a predetermined direction wherein the pickup apparatus comprises a recording magnet and an initialization auxiliary magnet provided on both sides of the magnetooptical recording medium together with the objective lens, the recording magnet is fixed so as to cover at least one track of the optical card, and the initialization auxiliary magnet is fixed so as to cover a width longer than a straight line connecting opposite ends of at least one track of the optical card and is disposed behind the recording magnet in a feeding direction of the optical card.

The optical pickup apparatus according to the first aspect of the present invention is configured such that the recording magnet and the initialization auxiliary magnet are provided in the rotary optical part, the recording magnet is disposed close to the objective lens and the initialization auxiliary magnet is disposed on the rotation circumference of the objective lens. Therefore, the optical card can be initialized before the light beam is converged onto the optical card through the objective lens.

The optical pickup apparatus according to the second aspect of the present invention is configured such that the recording magnet and the initialization auxiliary magnet arranged so as to pinch the magnetooptical recording medium with the objective lens are provided within the apparatus, the recording magnet is fixed so as to cover at least one track of the magnetooptical medium, and the initialization auxiliary magnet is fixed so as to cover the width longer than a straight line connecting opposite ends of at least one track of the optical card and is disposed behind the recording magnet in a sending direction. Therefore, the optical card can be initialized prior to the recording light beam.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
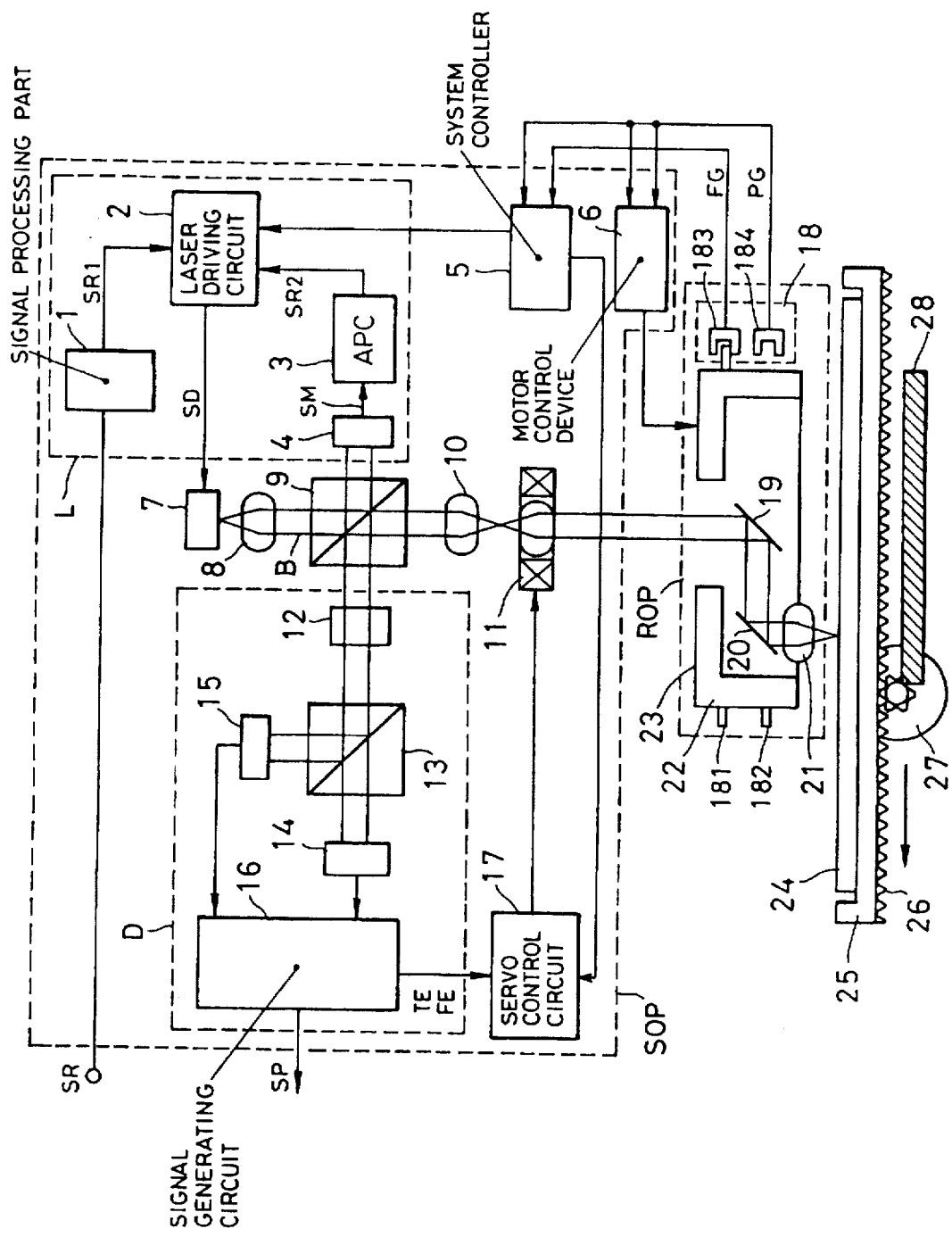
FIG. 1 is a block diagram showing a configuration of a conventional optical pickup apparatus.
Figure 2:
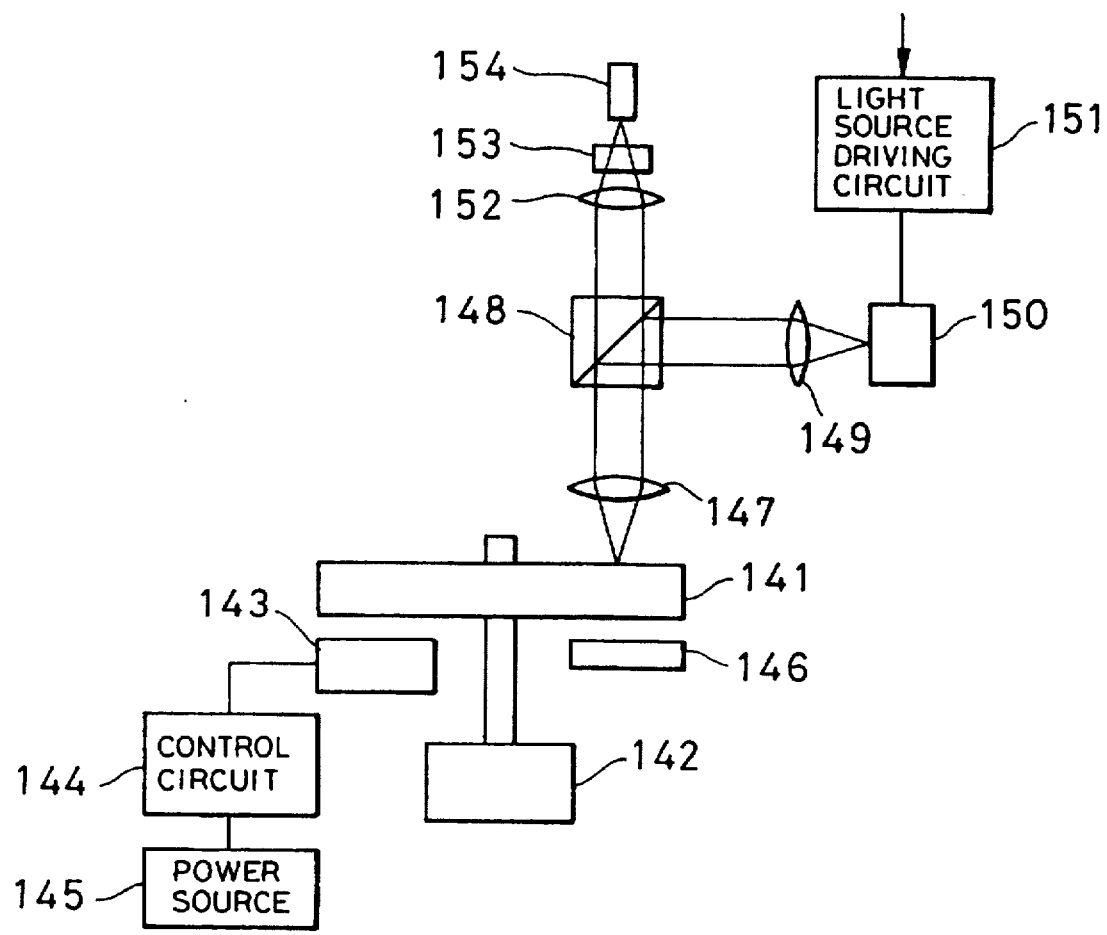
FIG. 2 is a schematic view showing a conventional magnetooptical recording/reproducing system.

Next, embodiments of the present invention will be described with reference to FIGS. 3 to 14. It should be noted that the same reference numerals are assigned to common parts to those of FIG. 1 and overlapping descriptions will be omitted in the following explanations.

(1) First Embodiment

Figure 3:
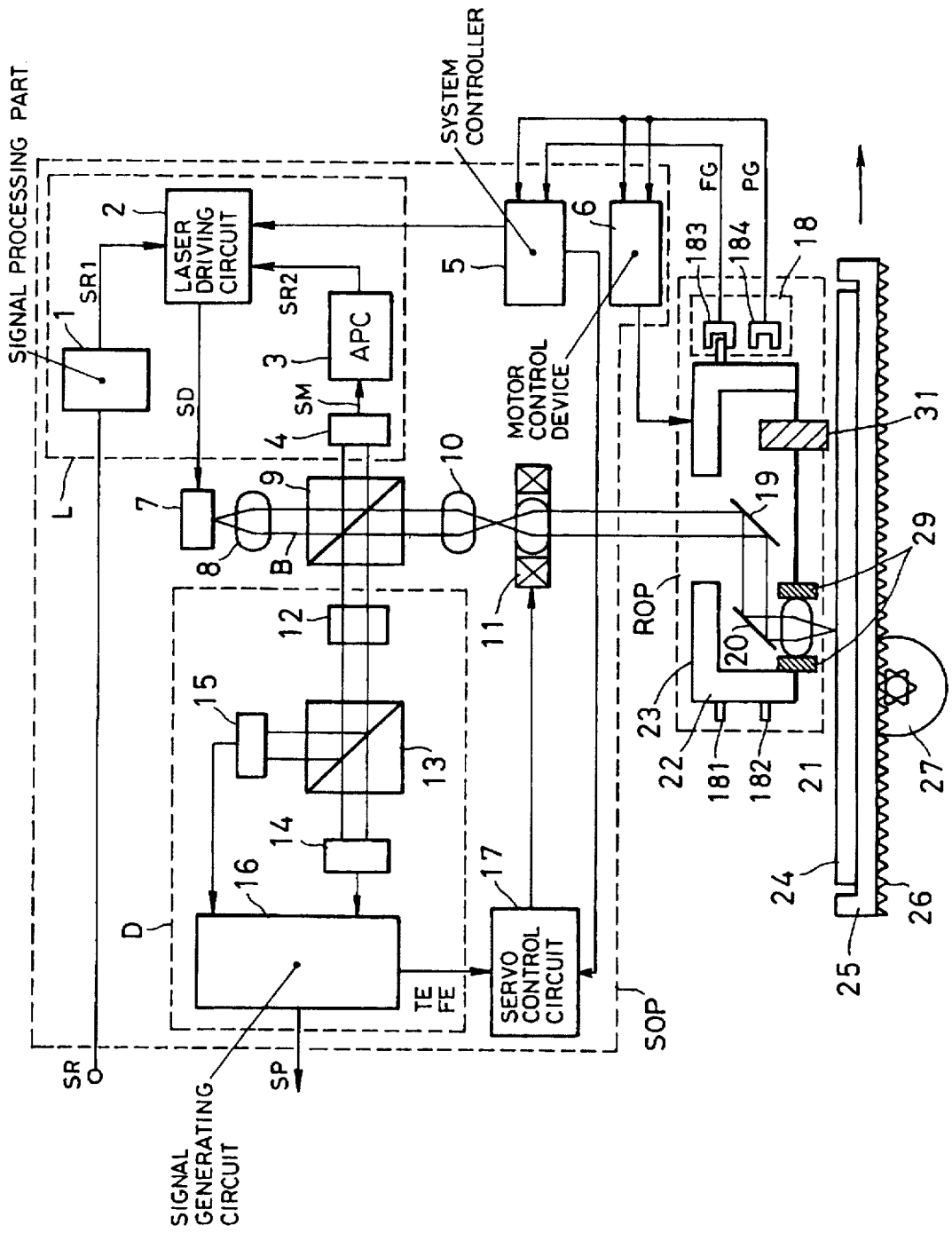
FIG. 3 is a block diagram showing a configuration of a first embodiment of the optical pickup apparatus of the present invention.
Figure 4:
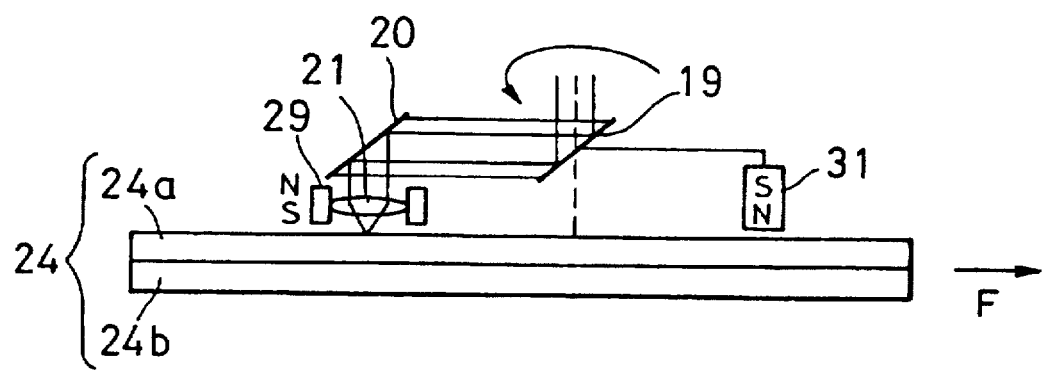
FIG. 4 is a schematic view showing a configuration of the optical pickup apparatus shown in FIG. 3.

FIG. 3 is a block diagram of a first embodiment of the optical pickup apparatus. The first embodiment of the optical picking-up apparatus differs from that of FIG. 1 in that the magnet 28 is removed a recording magnet 29 is newly employed and an initialization auxiliary magnet 31 is added. The recording magnet 29 serves to apply a magnetic field to an optical card 24 at the time of the recording of information, and the initialization auxiliary magnet 31 serves to apply an initialization auxiliary magnetic field to the optical card 24. FIG. 4 is a schematic view showing concrete arrangements of the recording magnet 29 and the initialization auxiliary magnet 31. The recording magnet 29 is disposed such that the magnet 29 is fixed to the periphery of an objective lens 21 in a rotary drum 22, rotates integrally with the rotary drum 22, and applies a magnetic field to a region on the optical card 24 where light beam is converged through the objective lens 21, the magnetic field being opposite to that of the initialization auxiliary magnet 31. A ring-shaped magnet so as to cover the periphery of the objective lens 21 is used as the recording magnet 29. The recording magnet 29 is not limited to this ring shape. The recording magnet 29 is sufficient to be employed in this embodiment as long as the magnet 29 has an ability to apply a magnetic field to a position where the light beam is converged by the objective lens 21.

The initialization auxiliary magnet 31 is disposed at an opposite position to the objective lens 21 relative to the rotation axis of the rotary drum 22 in the rotary drum 22 so that the magnet 31 rotates integrally with the rotary drum 22 and applies a magnetic field opposite to that of the recording magnet 29 to the optical card 24. The initialization auxiliary magnet 31 is provided on the rotation circumference of the objective lens 21 and at the position away from the objective lens 21 by approximately 180 degrees as shown in FIG. 4. However, after all, since it suffices that the initialization auxiliary magnet 31 arranges the magnetic orientation of the auxiliary layer of the optical card 24, the initialization auxiliary magnet 31 may be disposed at any position where there is no mutual effect of the magnet 31 and the optical card 24, as long as the magnet 31 is on the rotation circumference of the objective lens 21. Moreover, the magnet 31 may be disposed outside the rotation circumference of the objective lens 21. The magnet 31 may have a shape capable of applying a magnetic field enough to arrange the magnetic orientation of the auxiliary layer of the optical card 24. However, in this embodiment, from the viewpoint of a rotation balance and a space, the initialization auxiliary magnet 31 is disposed on the rotation circumference of the objective lens 21 and away from the objective lens 21 by approximately 180 degrees.

Figure 5:
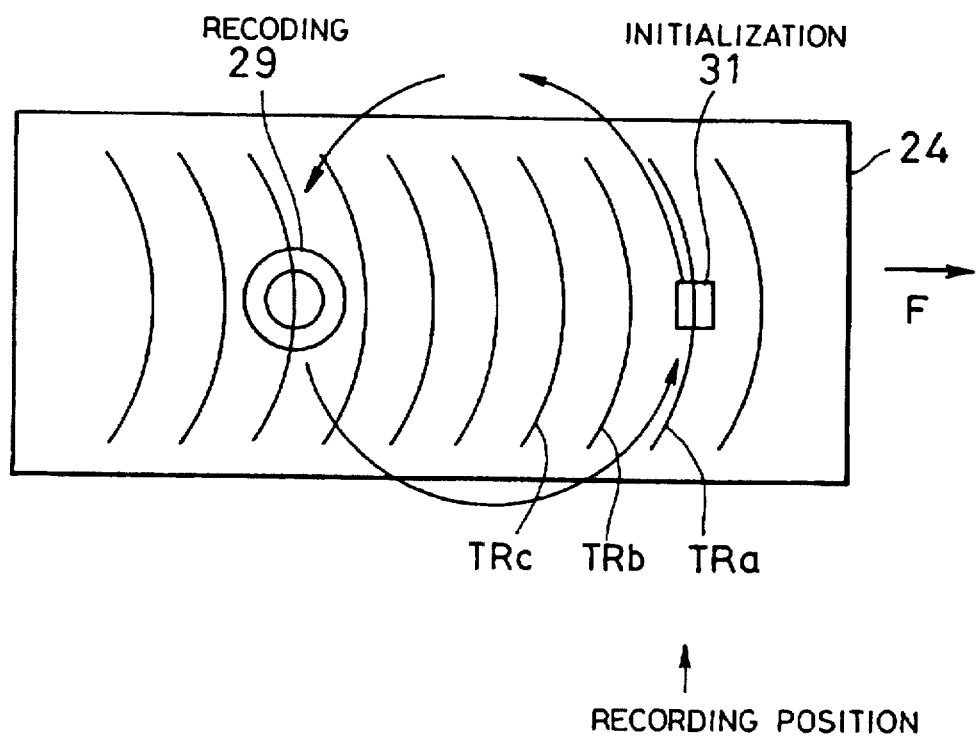
FIG. 5 is a schematic view showing a configuration of the optical pickup apparatus shown in FIG. 3.

FIG. 5 is a schematic plan view of the optical card 24 for explaining an initialization of information recorded onto the optical card 24 and recording of the information onto the optical card 24. Referring to FIG. 5, a ring-shaped magnet is used for the recording magnet 29 and a rectangular magnet is used for the initialization auxiliary magnet 31. The recording magnet 29 and the initialization auxiliary magnet 31 rotate counterclockwise around the rotation axis of the rotary drum 22 as shown with the arrow. Now, when the position of the recording track TRa is the information recording position, the magnetic orientation of the auxiliary layer 24b on the optical card 24 of the recording track TRa is made uniform by the initialization auxiliary magnet 31, whereby the initialization is performed. The initialization is performed at the position of the recording track TRa prior to recording, and is performed also at the place indicating the recording magnet 29 of FIG. 5. Next, as the magnets 29 and 31 rotate, the objective lens 21 fitting the recording magnet 29 moves over the recording track TRa, whereby information is recorded onto the recording layer 24a. When information for one track is recorded, the optical card 24 is transported in the direction of the arrow F. It is a matter of course that the transportation of the optical card 24 may be performed either continuously or intermittently. Thus the information is recorded onto the recording tracks TRb and TRc.

With the foregoing configuration, at the time of the recording of information, the recording auxiliary layer of the optical card 24 is first initialized by the initialization auxiliary magnet 31.

Thereafter, the light beam from the objective lens 21 and the magnetic field from the recording magnet 29 are applied onto the initialized recording track, and the information can be over-written to the recording layer of the optical card 24.

By the pickup apparatus having the foregoing configuration, the information is recorded onto the arc-shaped recording track on the optical card 24 while forming it at the time of the recording of information. Moreover, at the time of the reproduction of information, the recorded information is read out by the light beam B irradiated onto the recording track while the recording track is being traced by the light beam B.

(2) Second Embodiment

Figure 6:
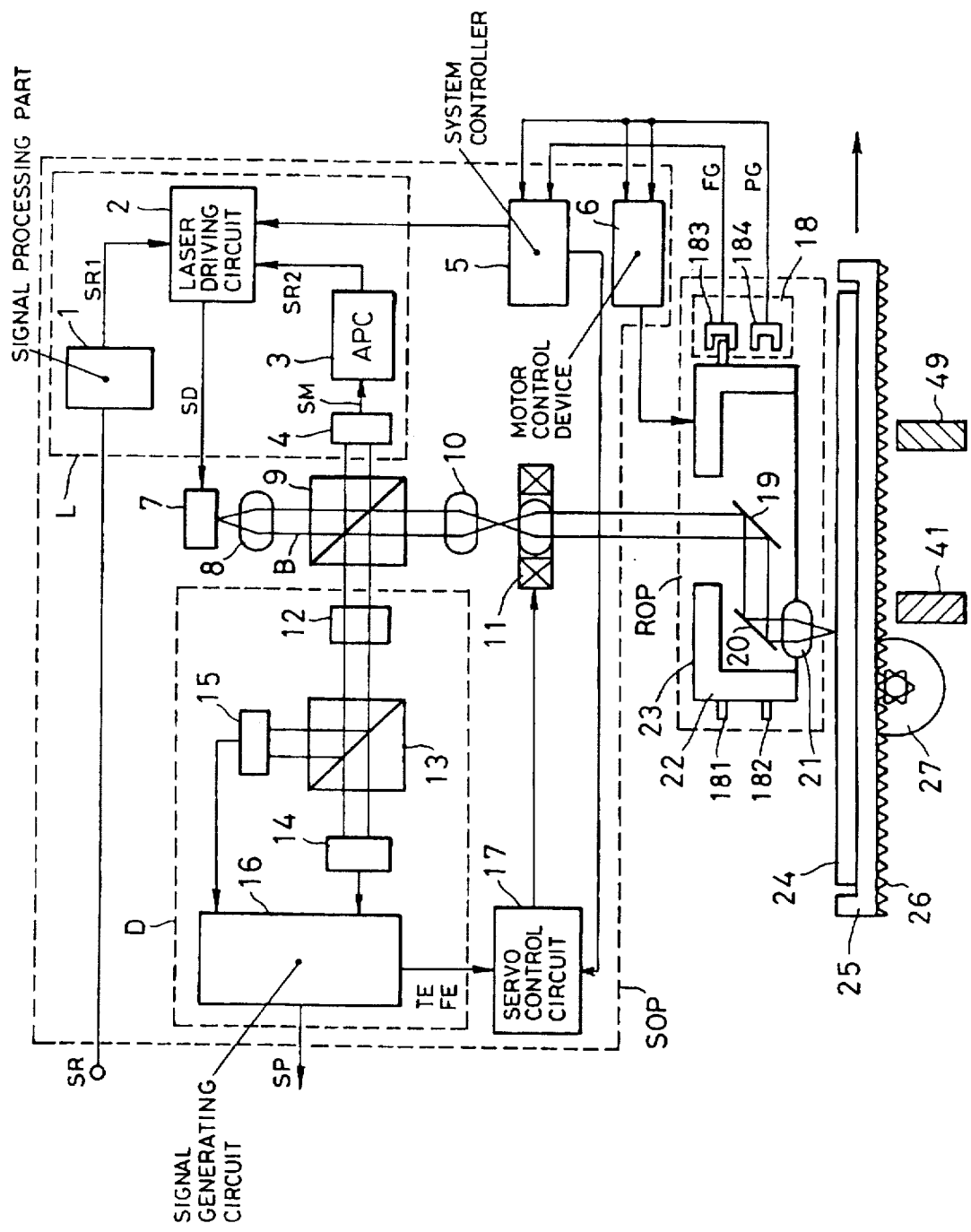
FIG. 6 is a block diagram showing a configuration of a second embodiment of the optical pickup apparatus of the present invention.

FIG. 6 is a block diagram of a second embodiment of the optical pickup apparatus. The second embodiment differs from the first embodiment in that a recording magnet 49 and an initialization auxiliary magnet 41 are disposed at positions opposite to the rotary drum 22 interposing the optical card 24.

Figure 7:
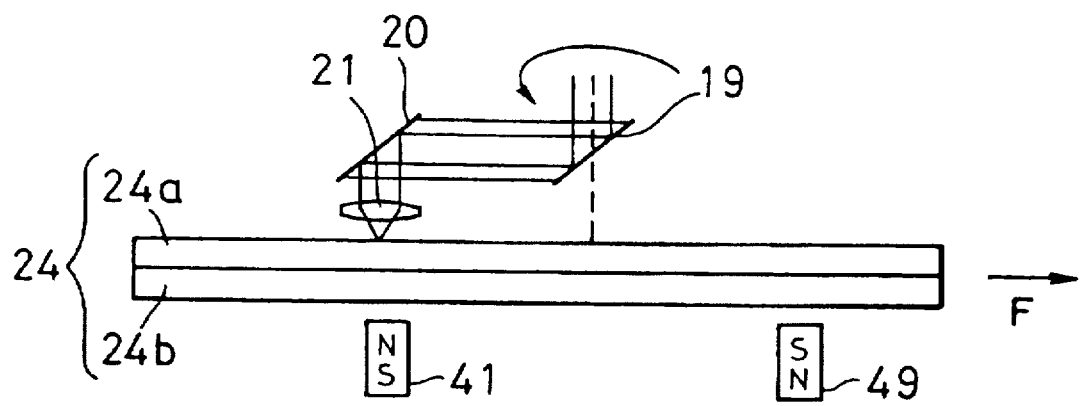
FIG. 7 is a schematic view showing a configuration of the optical pickup apparatus shown in FIG. 6.

FIG. 7 is a schematic view showing the concrete arrangement of the recording magnet 49 and the initialization auxiliary magnet 41. The recording magnet 49 is disposed at the position corresponding to the recording position of the optical card 24, the position being opposite to the rotary drum 22 interposing the optical card 24. The initialization auxiliary magnet 41 is disposed on the same side as the recording magnet 49 against the optical card 24, and is disposed so that a magnetic field by the initialization of the magnet 41 precedes that by the recording magnet 49 with respect to the transportation direction F of the optical card 24. The recording magnet 49 and the initialization auxiliary magnet 41 are provided so that both magnetic fields by the magnets 49 and 41 act on the optical card 24 with opposite polarities.

Figure 8:
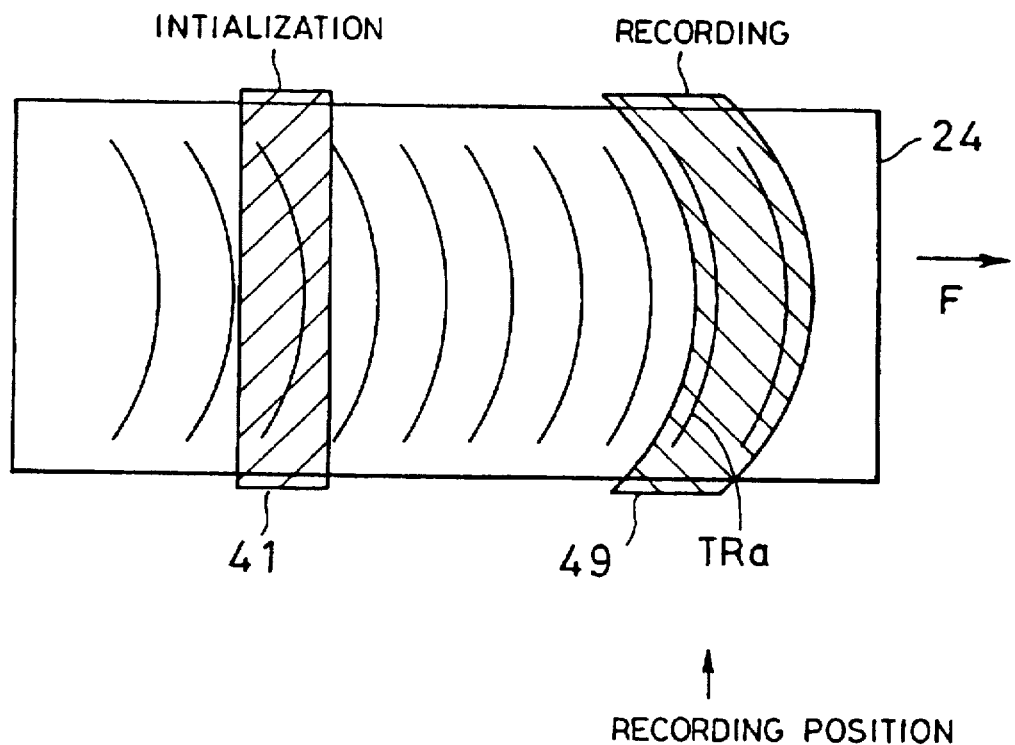
FIG. 8 is a schematic view showing a configuration of the optical pickup apparatus shown in FIG. 6.

FIG. 8 is a schematic plan view for explaining an initialization of information recorded onto the optical card 24 and a recording of the information onto the optical card 24.

Referring to FIG. 8, an arc-shaped magnet is used for the recording magnet 49 so that a magnetic field generated by the magnet 49 covers one recording track TRa. A rectangular magnet is used as the initialization auxiliary magnet 41 so that the magnet 41 has a length longer than a straight line provided by connecting opposite ends of the recording track TRa. Now, when the position of the recording track Tra is considered to be the information recording position, the track on the optical card 24 which has been already initialized by the magnetic field produced by the initialization auxiliary magnet 41, that is, the track on the optical card 24 disposed on the right portion from the initialization auxiliary magnet 41 in FIG. 8, is one having being subjected to the initialization. Specifically, the magnetic orientation of the auxiliary layer 24b is made uniform and the initialization has been completed. Next, when the objective lens 21 moves above the recording track TRa as the rotary drum 22 rotates, a magnetic field of the opposite polarity to that at the time of the initialization is applied by the recording magnet 49, whereby information is recorded onto the recording layer 24a. When the information for one track has been recorded, the optical card 24 is transported in the direction of the arrow F. It suffices that the initialization auxiliary magnet 41 is disposed so that the recording track in the recording position is initialized. Therefore, shapes other than rectangular ones can be applicable to the initialization auxiliary magnet 41, and, moreover, discrete magnets can be used for the magnet 41. Furthermore, it is sufficient that the recording magnet 49 can sufficiently apply a magnetic field to the recording position of one recording track TR. Therefore, the recording magnet 49 need not be arc-shaped, but it may have a wide rectangular shape. Moreover, as long as the initialization auxiliary magnet 41 is disposed at a position where the magnet 41 has no influence on the recording magnet 49, the initialization auxiliary magnet 41 may be disposed close to the recording magnet 49 shown in FIG. 8. Moreover, when the initialization auxiliary magnet 41 and the recording magnet 49 are provided in the tray holding the optical card 24, the optical pickup apparatus of the present can be further miniaturized.

(3) Third Embodiment

Figure 9:
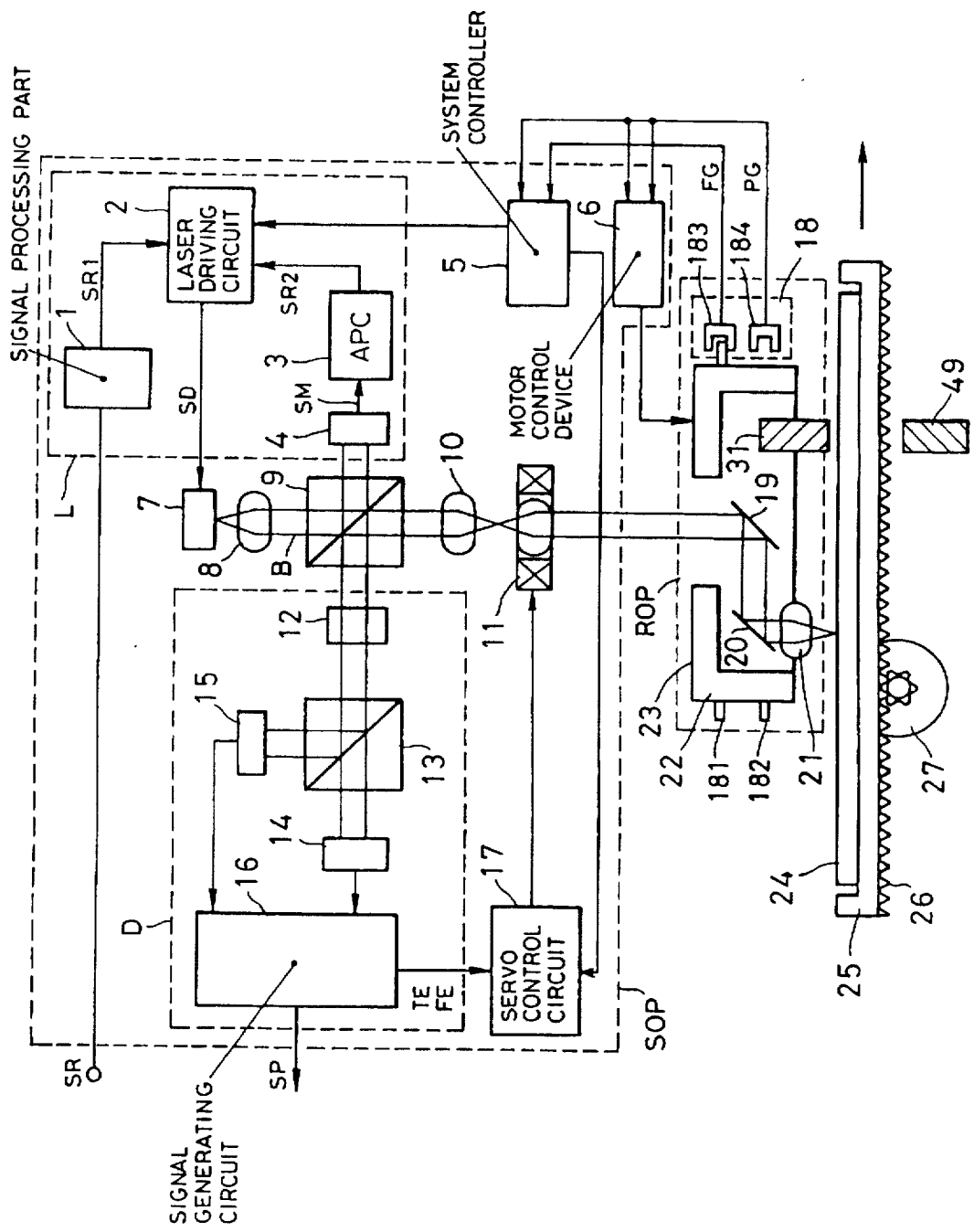
FIG. 9 is a block diagram showing a configuration of a third embodiment of the optical pickup apparatus of the present invention.

FIG. 9 is a block diagram of a third embodiment of the optical pickup apparatus. The third embodiment of the optical picking-up apparatus differs from the first embodiment of the optical pickup apparatus in that the recording magnet 49 is disposed in the same manner as the second embodiment.

Figure 10:
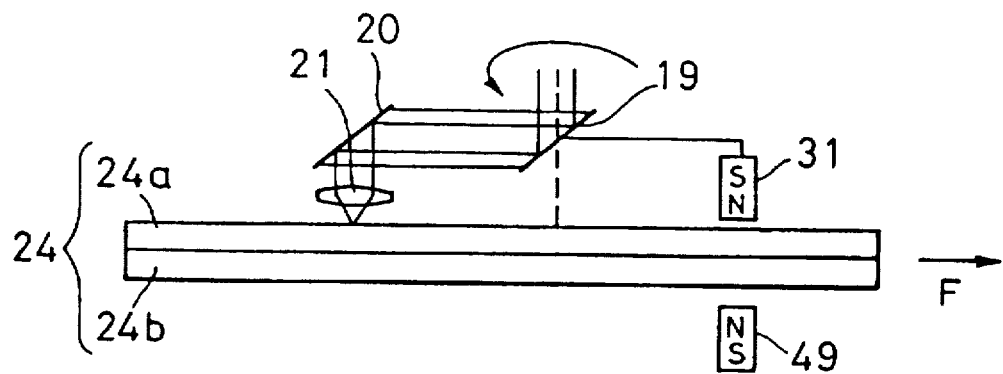
FIG. 10 is a schematic view showing a configuration of the optical pickup apparatus shown in FIG. 9.

FIG. 10 is a schematic view showing concrete arrangements of the recording magnet 49 and the initialization auxiliary magnet 31. It should be noted that the initialization auxiliary magnet 31 is disposed in the rotary drum 22 and the same magnet in the first embodiment is used as the magnet 31.

Therefore, the configurations and operations of the recording magnet 31 and the initialization auxiliary magnet 31 were described in the explanations for the first and second embodiments, and the descriptions for them are omitted. Since the magnetic field produced by the initialization auxiliary magnet 31 has an opposite polarity to that produced by the recording magnet 49 at the position of the recording track TRa, both magnets act so as to weaken the magnetic fields, and the initialization is performed when the initialization auxiliary magnet 31 rotates to the side where the objective lens 21 of FIG. 10 is shown. As a matter of course, the configurations and operations of the magnets are not limited to the above with adoption of a configuration in which the magnetic field of the recording magnet 49 can be controlled.

Figure 11:
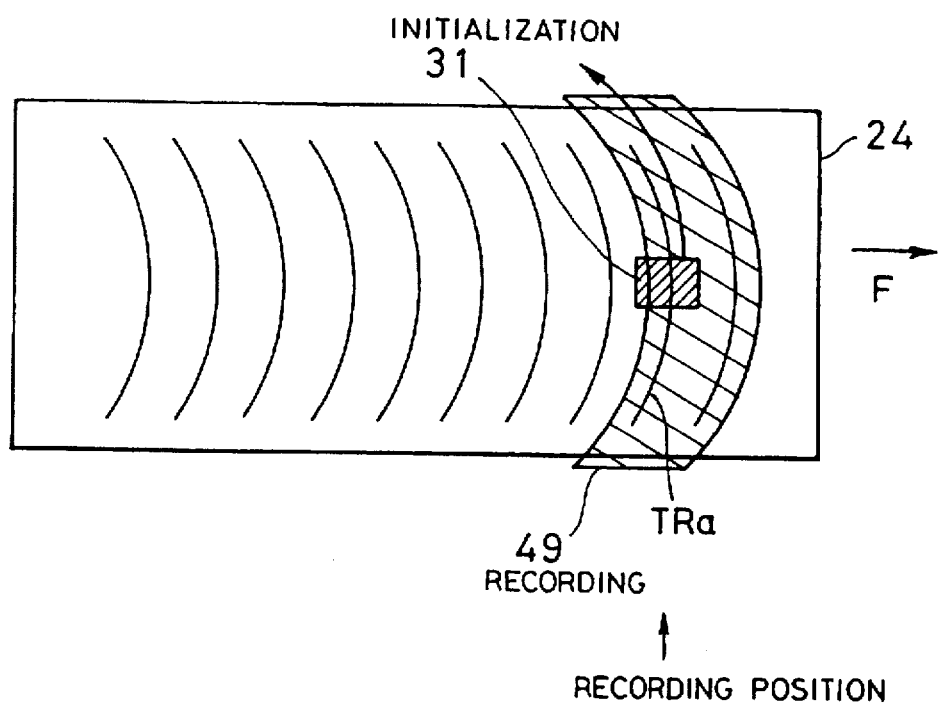
FIG. 11 is a schematic view showing a configuration of the optical pickup apparatus shown in FIG. 9.

FIG. 11 is a schematic plan view of the optical card 24 for explaining an initialization of information recorded onto the optical card 24 and recording of the information onto the optical card 24.

(4) Fourth Embodiment

Figure 12:
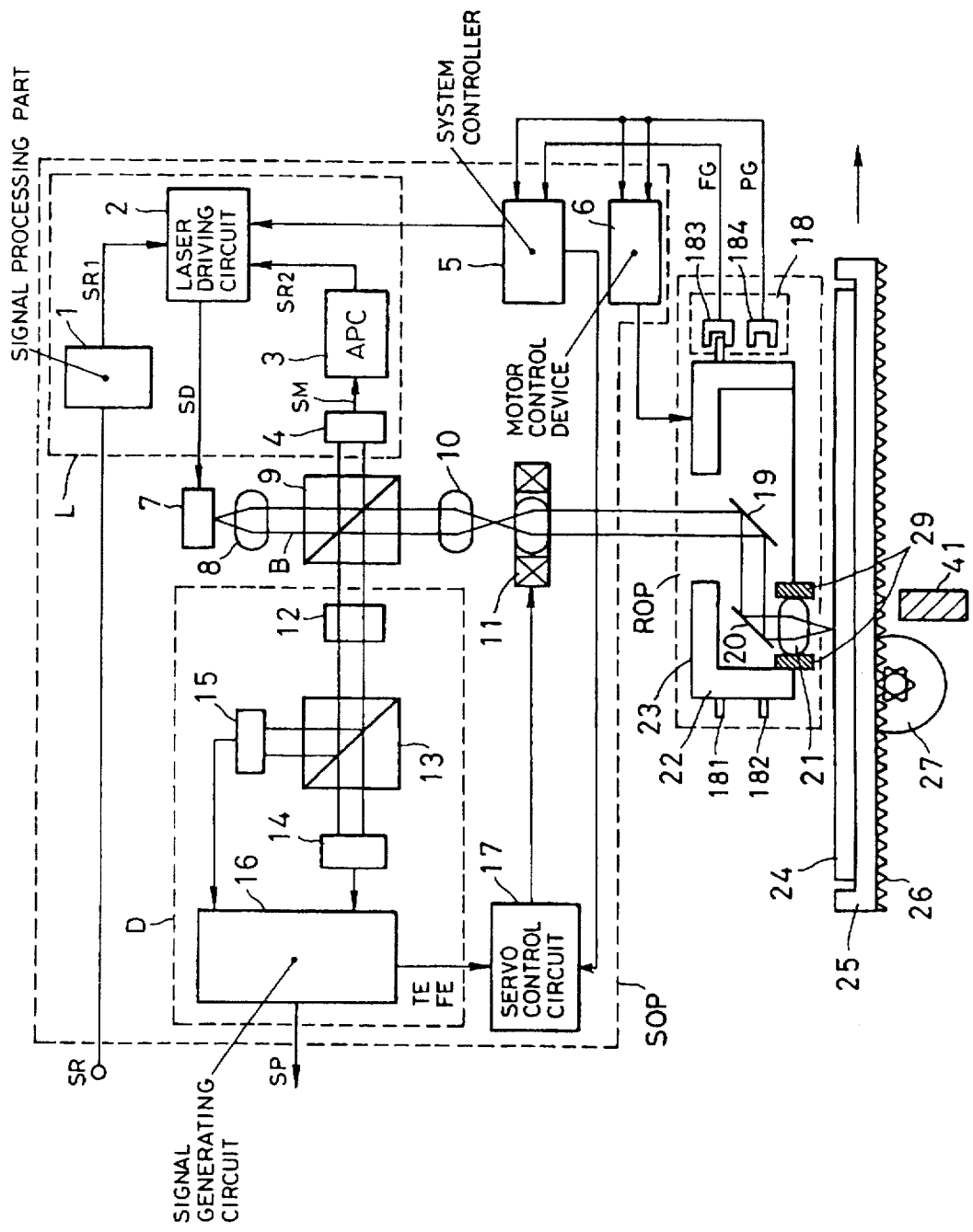
FIG. 12 is a block diagram showing a configuration of a fourth embodiment of the optical pickup apparatus of the present invention.

FIG. 12 is a block diagram of a fourth embodiment of the optical card 24. The fourth embodiment of the optical card 24 differs from the first embodiment of the optical card 24 in that the initialization auxiliary magnet 41 is disposed as in the second embodiment.

Figure 13:
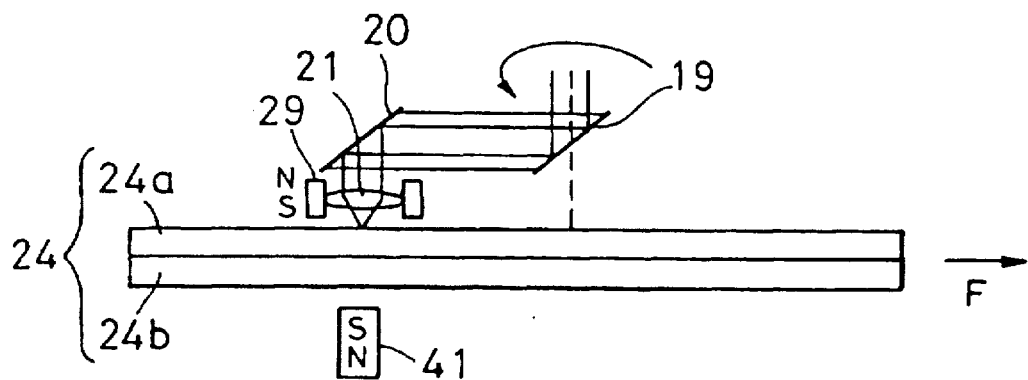
FIG. 13 is a schematic view showing a configuration of the optical pickup apparatus shown in FIG. 12.
Figure 14:
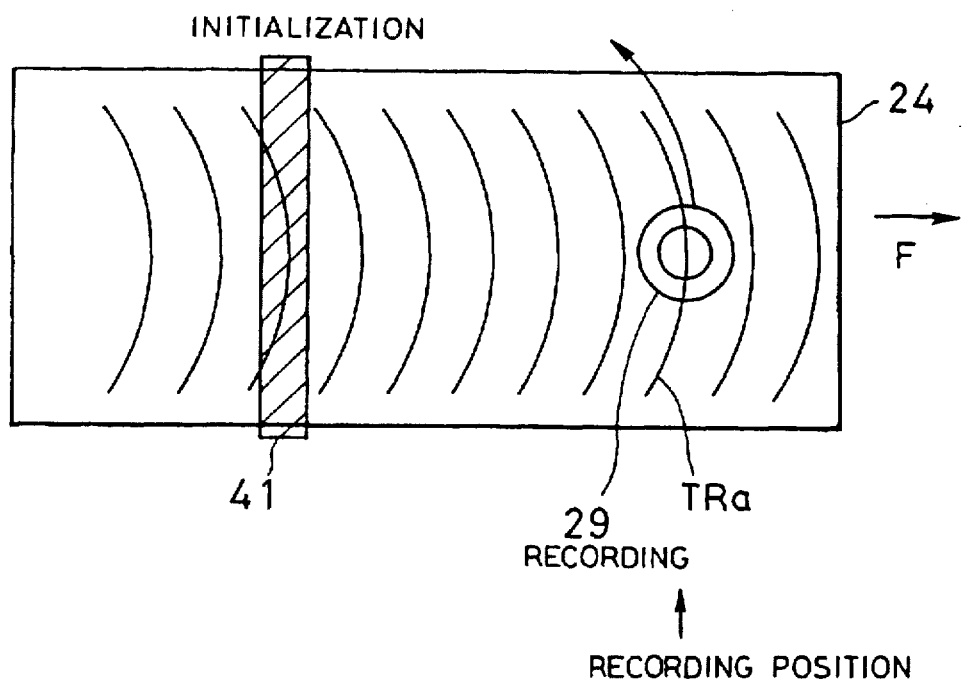
FIG. 14 is a schematic view showing a configuration of the optical pickup apparatus shown in FIG. 12.

FIGS. 13 and 14 are schematic views showing arrangements of the recording magnet 29 and the initialization auxiliary magnet 41 in this embodiment. It should be noted that the same magnet as that of the first embodiment is used for the recording magnet 29 of this embodiment and the same magnet as that of the second embodiment is used for the initialization auxiliary magnet of this embodiment. The configurations and operations of them were described in the descriptions in the first and second embodiments and the descriptions for them are not repeated.

As described above, according to the present invention, an initialization auxiliary magnet and a recording magnet are provided in a rotary drum in order to make over-writing of information possible in an optical pickup apparatus for a magnetooptical recording, whereby miniaturization of the apparatus can be achieved. Moreover, the initialization auxiliary magnet is disposed at a position where the initialization auxiliary magnet is able to perform initialization prior to the recording magnet, whereby the apparatus has an ability to perform over-writing with a simple configuration.

Although the preferred embodiments of the present invention have been described in detail, it should be understood that various changes, substitutions and alternations can be made therein without departing from spirit and scope of the inventions as defined by the appended claims.

What is claimed is:

1. An optical pickup apparatus comprising:

a stationary optical part; and a rotary optical part which includes an objective lens for converging light beam for recording/reproducing information onto a recording surface of a magnetooptical recording medium, said light beam being emitted from said stationary optical part, and a light beam guiding device for guiding said light beam onto said recording surface through said objective lens and for guiding reflected light of said light beam from said recording surface, said rotary optical part being rotatively driven around a straight line perpendicular to said recording surface integrally with said objective lens and said light beam guiding device, wherein said rotary optical part comprises a recording magnet and an initialization auxiliary magnet therein, said recording magnet is disposed close to said objective lens, and said initialization auxiliary magnet is disposed over a rotation circumference where said objective lens rotates.

2. An optical pickup apparatus comprising:

a stationary optical part;

a rotary optical part which includes an objective lens for converging light beam for recording/reproducing information onto a recording surface of a magnetooptical recording medium, said light beam being emitted from said stationary optical part, and a light beam guiding device for guiding said light beam onto said recording surface thereof through said objective lens and for guiding reflected light of said light beam from said recording surface, said rotary optical part being rotatively driven around a straight line perpendicular to said recording surface integrally with said objective lens and said light beam guiding device; and a driving device for moving said magnetooptical recording medium in a predetermined direction, wherein said rotary optical part comprises a recording magnet and an initialization auxiliary magnet disposed on both sides of said magnetooptical recording medium together with said objective lens, said recording magnet is fixed so as to cover at least one track of said magnetooptical recording medium, and said initialization auxiliary magnet is fixed so as to cover a width longer than a straight line connecting opposite ends of at least one track of an optical card, said initialization auxiliary magnet being positioned behind said recording magnet in a direction of a feed of said optical card.

* * * * *